United States Patent [19]
Beaucaire

[11] 3,986,953
[45] Oct. 19, 1976

[54] TREATMENT OF WASTE ROLLING OIL

[75] Inventor: Victor D. Beaucaire, Orland Park, Ill.

[73] Assignee: Interlake, Inc., Chicago, Ill.

[22] Filed: Jan. 8, 1976

[21] Appl. No.: 647,598

Related U.S. Application Data

[63] Continuation of Ser. No. 456,689, April 1, 1974, abandoned.

[52] U.S. Cl. .................................. 210/43; 210/47; 210/50; 210/53; 210/56; 252/358
[51] Int. Cl.² .......................................... C02B 1/20
[58] Field of Search ............. 210/28, 42, 47, 51–53, 210/56, 175, 178, 59, 220, DIG. 21; 252/328, 330, 358

[56] References Cited
UNITED STATES PATENTS

| | | | |
|---|---|---|---|
| 2,679,537 | 5/1954 | Knowlton | 210/50 |
| 2,810,633 | 10/1957 | Cooper | 210/53 |
| 3,301,779 | 1/1967 | Kovacs | 210/52 |
| 3,617,562 | 11/1971 | Cywin | 210/50 |

OTHER PUBLICATIONS

*Chemical Treatment of Industrial Wastes*, 1965, pp. 76–79.
Haseltine, "Character and Treatment of Soluble Oil Wastes," *Sewage Works Journal*, Sept. 1949, pp. 859–876.

*Primary Examiner*—Charles N. Hart
*Assistant Examiner*—Peter A. Hruskoci
*Attorney, Agent, or Firm*—Prangley, Dithmar, Vogel, Sandler & Stotland

[57] ABSTRACT

A process for treating waste rolling oil in the form of an oil and water emulsion. The oil and water emulsion is used during the cold rolling of steel to reduce the thickness thereof and is treated by breaking the emulsion with waste pickling acid solution and thereafter converting iron ions present in the waste pickling acid solution to magnetite particles which absorb the oil. The magnetite particles and the oil absorbed thereby are separated from the solution leaving a clarified solution.

8 Claims, 1 Drawing Figure

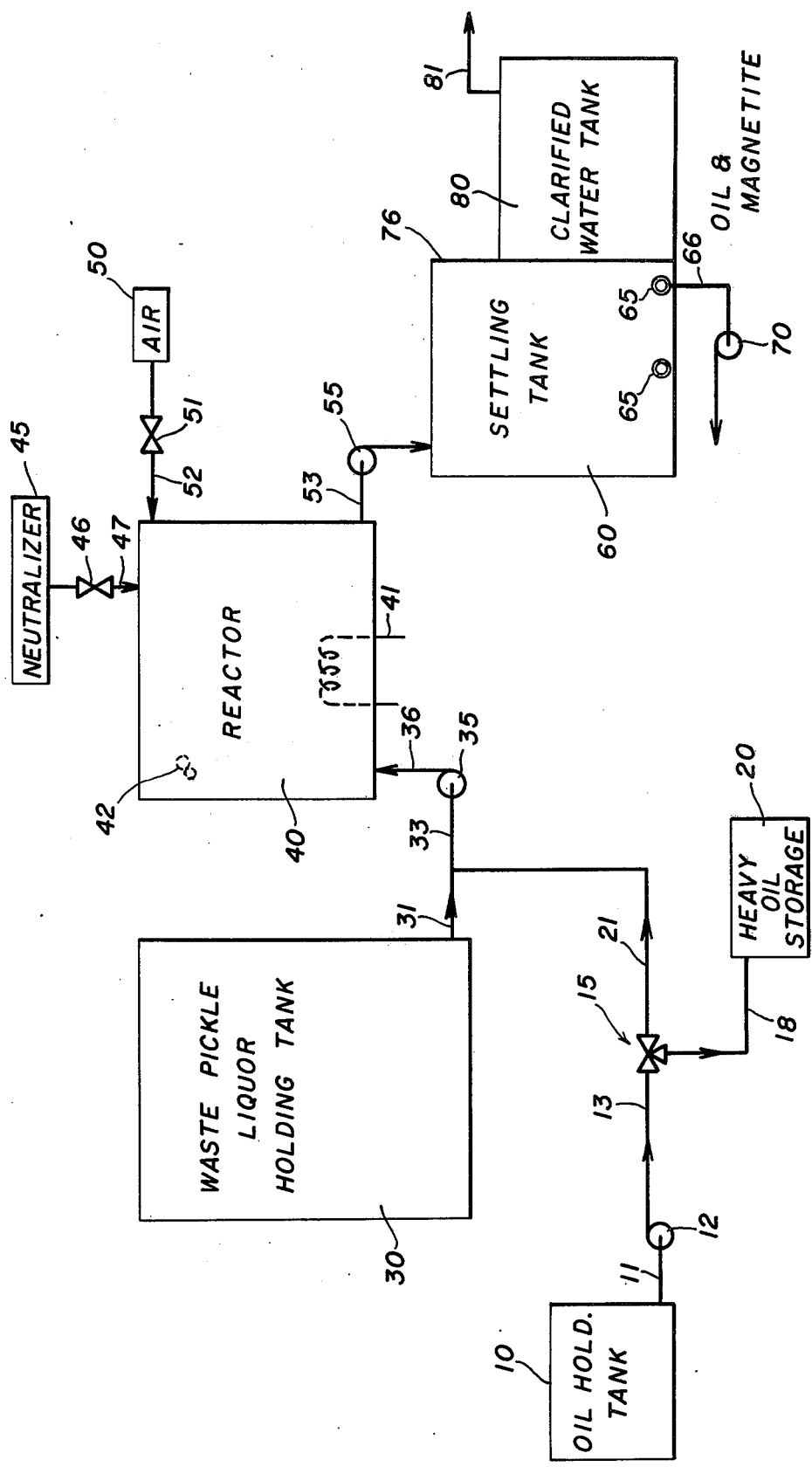

TREATMENT OF WASTE ROLLING OIL

This is a Continuation of application Ser. No. 456,689, filed Apr. 1, 1974, now abandoned.

BACKGROUND OF THE INVENTION

During the cold rolling of steel to reduce the thickness thereof for producing strapping and sheeting of various gauges, rolling oil is used to facilitate the cold rolling operation. In industry, a considerable amount of oil is used during the cold rolling operation and must be disposed of periodically. The dimensions of the problem are understood when it is known that in excess of 100,000 gallons of waste rolling oil and water emulsion may be discarded each month in a medium size steel producing facility. This large quantity of rolling oil and water emulsion is costly to dispose of and also presents an environmental hazard if dumped untreated into the sewer system or into lakes or streams.

An additional operation in the production of steel strapping or sheeting is the pickling of the steel with a hydrochloric acid bath. The pickling operation removes mill scale and the like, and it is necessary for the production of good quality unstained sheets and strips. The waste pickle liquor, which contains iron ions therein, also presents a disposal problem, the treatment of which is discussed in U.S. Pat. No. 3,434,797 issued Mar. 25, 1969 to Taylor & Krikau. The disposal problem is aggravated by the fact that perhaps thirty times more waste pickle liquor is produced per month than waste rolling oil and water emulsion.

SUMMARY OF THE INVENTION

This invention relates to a process for treating waste rolling oil and more particularly relates to a process for breaking a water and oil emulsion and thereafter absorbing the oil with magnetite produced from waste pickle liquor.

It is a general object of the present invention to provide a process for treating waste rolling oil in the form of a water and oil emulsion, which process is compatible with methods now employed for the treatment of waste pickle liquor and makes use of the method for treating the waste pickle liquor.

It is an important object of the present invention to provide a process for treating an oil and water emulsion, comprising mixing the oil and water emulsion with an acid solution containing iron ions to break the oil and water emulsion, adjusting the pH of the solution to a value in the range of from about 7 to about 12 and mixing oxygen therewith to produce magnetite particles for absorbing the oil, and separating the magnetite and the oil absorbed thereby from the solution to produce a clarified solution.

These and other objects of the present invention, together with further objects and advantages thereof, will best be understood by reference to the following specification when taken in connection with the accompanying drawing.

BRIEF DESCRIPTION OF THE DRAWING

The drawing is a schematic flow diagram showing the system and process of the present invention.

DESCRIPTION OF THE PREFERRED EMBODIMENT

Referring now to the drawing, there is disclosed a rolling oil holding tank 10 having a pipe 11 leading therefrom into a pump 12. a pipe 13 interconnects the pump 12 with a three-way valve 15. The three-way valve 15 is constructed and arranged to halt the flow of waste rolling oil from the pipe 13 or to conduct certain portions of the waste rolling oil known as tramp oils to a heavy oil storage tank 20 through a pipe or conduit 18. The rolling oil used during the cold rolling of steel picks up machine grease, motor lubricating oils and the like, all of which are herein categorized as heavy oil or tramp oil. These heavy oils or tramp oils are separated from the rolling oils and preferably are not treated by the system of the present invention.

The three-way valve 15 is constructed to pass oil from the pump 12 through a conduit 21 into a pipe or conduit 31. The waste pickle liquor holding tank 30 has an outlet conduit 31 connected to a pump 35, the portion of the pipe 31 wherein both acid and oil are present is identified by the number 33. A pipe 36 interconnects the pump 35 with the reactor 40. The reactor 40 is a large tank having a heating mechanism 41 and an agitator 42 therein. The waste pickle liquor solution mixed with the water and oil emulsion is introduced into the reactor 40 through the pipe 36. A source of neutralizer 45 is provided and the neutralizer flows from the source 45 through a metering valve 46 and a pipe 47 into the reactor 40. The reaction taking place in the reactor requires oxygen and to this end, a source of compressed air 50 is provided and air is introduced therefrom through a metering valve 51 and a pipe 52 into the reactor 40.

When the water and oil emulsion is introduced into the pipe 31 and mixed with the waste pickle liquor solution, the emulsion is destabilized to begin freeing the rolling oil. The water and oil emulsion is very stable due to the fact that the oil is broken into very small drops during the rolling process. The free oil is present in the reactor 40 during the formation of the magnetite and is absorbed thereby. The magnetite absorbs the oil but is not "oily" to the touch and can be filtered from solution without changing the physical characteristics of the filter cake produced by filtering magnetite alone. When the oil is added after the reaction has taken place and the magnetite is in existence, for some reason not precisely understood, the magnetite is oily to the touch. It is possible that the addition of the oil and water emulsion to the pickle liquor after the magnetite has been formed results in an adsorption rather than an absorption. In any event, in order to preserve the physical characteristics of the magnetite filter cake and to ensure that no problems arise in the filtering operation, it is preferred to add the water and oil emulsion to the waste pickle liquor prior to the reaction for producing the magnetite. Accordingly, the oil and water emulsion is added to the suction side of the pump 35 which results in complete mixing of the acid and the emulsion in the pump, thereby breaking the emulsion.

The solution in the reactor 40 is pumped therefrom through a pipe 53 and pump 55 into a settling tank 60 wherein the magnetite particles settle to the bottom of the tank leaving a clarified aqueous solution. A plurality of apertured pipes 65 are positioned on the bottom of the settling tank 60 and are connected by a conduit 66 to a pump 70 which upon actuation sucks the magnetite particles and the oil absorbed thereby out of the bottom of the settling tank to a filtering mechanism, not shown. The clarified solution in the settling tank overflows a weir 76 at the end of the settling tank and cascades into a clarified water tank 80.

The rolling oil treated is a light oil having an SUS viscosity at 100° F. of 270 ± 10. The free fatty acid content expressed as a percent of oleic acid is 1.5 ± 1 and the saponification number is 43 ± 3. The pH of 5% oil in tap water is 7. It is intended that the system and process herein disclosed not be limited to the specific rolling oil thus described but to any oil used in the cold rolling of steel. Preferably, the rolling oil is meant to exclude motor grease and motor lubricating oil generally termed in the industry as tramp oils, but some tramp oil can be accommodated without altering the physical characteristics of the filter cake or polluting the clarified water.

The waste pickle liquor generally used in industry may contain, after dilution with rinse water, hydrochloric acid in the range of from about 1.0 gram per liter to about 15 grams per liter and iron generally in the plus 2 valence state to the same extent as the acid, that is, in the range of from about 1.0 gram per liter to about 15 grams per liter. The amounts of acid and iron present in the waste pickle liquor are not critical provided that there are sufficient amounts to break the water and oil emulsion. Large amounts of either acid or iron do not adversely affect the absorption of the free oil by the magnetite.

The reaction that takes place in the reactor 40 converts the iron present to $Fe_3O_4$. The $Fe_3O_4$ or magnetite is a black particulate material which settles and is easily separated from the solution. The preferred neutralizer used in the reaction is lime. However, caustic soda may also be used. Generally, either the lime or the caustic soda is added with water and in an amount sufficient to maintain the pH in the reactor 40 in the range of from about 7 to about 12.

The required pH value in the above-identified range is somewhat dependent on the temperature at which the constituents in the reactor 40 are maintained, the heating mechanism 41 being adjusted to maintain a temperature in excess of 100° F. and generally between 115° and 212° F. For economic reasons, it is clear that the lower temperature and the lower pH value are preferred. In any event, depending on the specific temperature, the pH is adjusted to produce a black particulate magnetite. The constituents in the reactor 40 are mixed by the agitator 42. The oxygen required for the reaction is introduced under pressure and the agitation produced by the bubbling of the air through the liquid in the reactor 40 assists in providing the mixing necessary for the reaction to take place.

Several laboratory tests as well as in-plant trials have been conducted, the result of the laboratory test being set forth in Table 1.

TABLE 1. Laboratory Tests — Rolling Oil in the Waste Pickle Liquor System.

| Run No. | Pickle Liquor % Fe | Pickle Liquor % HCl | Pickle Liquor ml[1] | ml Rolling Oil[1] [2] | pH Range in Reactor[3] | Oil in Water After Filtering, ppm |
|---|---|---|---|---|---|---|
| 26 | 15.8 | 6.4 | 500 | 100 | 9.6 – 8.9 | 1.3 |
| 27 | 15.8 | 6.4 | 250 | 250 | 9.0 – 8.7 | 11.6 |
| 30 | 1.8 | 0.7 | 900 | 100 | 9.0 – 6.8 | 3.5 |
| 33 | 1.8 | 0.7 | 900 | 100 | 9.1 – 6.6 | 3.8 |
| 47 | 2.6 | 1.1 | 600 | 0 | 8.5 – 9.0 | 2.7 |
| 48 | 3.2 | 1.3 | 500 | 100 | 8.0 – 9.0 | 4.2 |
| 49 | 4.0 | 1.6 | 400 | 200 | 8.0 – 9.5 | 3.7 |
| 50 | 5.3 | 2.1 | 300 | 300 | 8 – 12+[4] | 4.1 |
| 51 | 4.0 | 1.6 | 400 | 200 | 11.5 – 7.0 | 6.3 |
| 52 | 1.2 | 0.5 | 325 | 200 | 8.6 – 6.5 | 5.3 |
| 53 | 1.2 | 0.5 | 325 | 200 | 9.2 – 7.0 | 6.5 |
| 54 | 1.2 | 0.5 | 325 | 200 | 11.0 – 11.8 | 3.9 |
| 55 | 1.0 | 0.4 | 400 | 400 | 11.0 – 11.5 | 0.8 |

[1]Some of these figures are actual volumes, others are volume ratios for individual runs.
[2]The rolling oil contained about 4 percent oil.
[3]Lime slurry was used for neutralization and pH control. Reactor temperature was kept at 212° F.
[4]This was a continuous run during which the acid/oil feed line clogged, causing the mixture to go very alkaline. The high alkalinity and high oil content at 212° F. produced some white fume. No fume was observed during any other run.

Referring now to Table 1, there is shown that the iron content of the pickle liquor was as much as 15.8% or about 160 grams per liter and as little as 1.0%. The variation in the per cent of acid in the pickle liquor was from 0.4% to 6.4% or about 65 grams per liter. The variation in the volume ratios of pickle liquor to rolling oil vary from infinite in run 47 wherein no rolling oil was used to a one-to-one ratio in run 27. Generally, it is preferred that the ratio of pickle liquor to rolling oil be maintained greater than one to insure that sufficient magnetite is produced to absorb all the oil. In the laboratory tests, a water-oil emulsion having about 4% oil was used, but in the plant tests, the water-oil emulsion had up to 5.5% oil present.

Referring to Table 1, it is seen that the greatest parts per million of the oil appearing in the water after filtration was in run 27 with the oil being present in the amount of 11.6 parts per million. Current goals are no greater than 10 parts per million oil when discharged directly into rivers and streams and no more than 100 parts per million oil when discharge is to treatment facilities or sewer treatment facilities. These goals are dictated by state law which is subject to change and are meant to be guide lines only.

In-plant tests have been conducted wherein the per cent oil range from 1.5 to about 5.5 and the per cent acid ranged from 0.1 to 1.4. The per cent iron ranged from 0.3 to 1.5. In all the plant tests, the parts per million oil in the clarifier ranged from 1 to 41. The filter cake produced ranged in per cent solids from about 42% to about 60% and the per cent oil in the filter cake ranged from about 1.17% to about 28%. Clearly, various combinations of oil content, acid content, and iron content as well as the temperature and pH of the constituents in the reactor affect the per cent oil appearing in the clarifier as well as the amount of oil appearing in the filter cake. Nevertheless, each of the runs produced clarified solutions well within the goals hereinbefore set forth.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. A process for treating an oil and water emulsion wherein the oil and water emulsion contains not more than about 10% oil, the oil having a SUS viscosity at 100° F. of about 270 ± 10 and a saponification number of about 43 ± 3, comprising mixing the oil and water with a hydrochloric acid solution containing iron ions to break the oil and water emulsion, adjusting the pH of the solution with lime to a value in the range of from about 7 to about 12 and mixing oxygen therewith while maintaining the solution at a temperature in the range of from about 100° F. to about 212° F. to convert said iron ions into magnetite particles for absorbing the oil and separating the magnetite and the oil absorbed thereby from the solution to produce a clarified solution and a non-oily filter cake.

2. The process set forth in claim 1, wherein the volume ratio of the acid solution to the water and oil emulsion is maintained greater than 1.

3. The process set forth in claim 1, wherein the acid in the acid solution is present in the range of from about 1.0 to about 65 grams per liter.

4. The process set forth in claim 1, wherein the iron in the acid solution is present in the range of from about 1.0 to about 160 grams per liter.

5. The process set forth in claim 1, wherein the acid solution having the oil and water emulsion mixed therein is maintained at a temperature in excess of 100° F. while the pH is being adjusted.

6. The process set forth in claim 1, wherein the acid solution having the oil and water emulsion mixed therein is maintained at a temperature of about 115° F. and the pH is maintained in the range of from about 8 to about 10 by adding lime thereto.

7. A process for treating a waste rolling oil and water emulsion wherein the rolling oil and water emulsion contains not more than about 10% rolling oil, comprising mixing the rolling oil and water emulsion with a waste acid pickle liquor containing iron ions to break the rolling oil and water emulsion, adjusting the pH of the solution with lime to a value in the range of from about 7 to about 12 and mixing oxygen therewith while maintaining the solution at a temperature in the range of from about 100° F. to about 212° F. to convert said iron ions into magnetite particles for absorbing the rolling oil and separating the magnetite and rolling oil absorbed thereby from the solution to produce a clarified solution and a non-oily filter cake.

8. The process set forth in claim 7, wherein the filter cake has a solids content in the range of from about 40% by weight to about 60% by weight.

* * * * *